United States Patent
Amrhein et al.

(10) Patent No.: US 9,177,071 B2
(45) Date of Patent: Nov. 3, 2015

(54) DYNAMICALLY LOADABLE CONTACT CENTER BOOKMARKS IN CO-BROWSING ENVIRONMENTS

(75) Inventors: Dustin K. Amrhein, Cedar Park, TX (US); Erik J. Burckart, Releigh, NC (US); Andrew J. Ivory, Wake Forest, NC (US); Aaron K. Shook, Raleigh, NC (US)

(73) Assignee: International Business Machines Corporation, Armonk, NY (US)

(\*) Notice: Subject to any disclaimer, the term of this patent is extended or adjusted under 35 U.S.C. 154(b) by 1026 days.

(21) Appl. No.: 13/111,053

(22) Filed: May 19, 2011

(65) Prior Publication Data

US 2012/0297318 A1    Nov. 22, 2012

(51) Int. Cl.
*G06F 3/048* (2013.01)
*G06F 17/30* (2006.01)

(52) U.S. Cl.
CPC .... *G06F 17/30884* (2013.01); *G06F 17/30873* (2013.01); *G06F 2216/15* (2013.01)

(58) Field of Classification Search
CPC .......... G06F 17/30873; G06F 2216/15; G06F 17/30884
USPC ........................................................ 715/751
See application file for complete search history.

(56) References Cited

U.S. PATENT DOCUMENTS

| | | | |
|---|---|---|---|
| 6,144,991 A * | 11/2000 | England | 709/205 |
| 6,871,213 B1 * | 3/2005 | Graham et al. | 709/205 |
| 7,051,117 B2 | 5/2006 | McGee et al. | |
| 7,133,895 B1 | 11/2006 | Lee et al. | |
| 7,277,408 B2 | 10/2007 | Sorsa | |
| 7,401,294 B2 | 7/2008 | Chang et al. | |
| 7,856,441 B1 | 12/2010 | Kraft et al. | |
| 8,682,977 B1 * | 3/2014 | Roy et al. | 709/205 |
| 2004/0225716 A1 * | 11/2004 | Shamir et al. | 709/204 |
| 2004/0229201 A1 * | 11/2004 | Korkko et al. | 434/350 |
| 2005/0097159 A1 * | 5/2005 | Skidgel | 709/200 |
| 2005/0216526 A1 * | 9/2005 | Kumagai | 707/201 |
| 2008/0201418 A1 * | 8/2008 | Krishnan et al. | 709/204 |
| 2009/0037517 A1 * | 2/2009 | Frei | 709/202 |
| 2009/0249244 A1 * | 10/2009 | Robinson et al. | 715/781 |
| 2010/0036642 A1 | 2/2010 | Pagels | |
| 2010/0205541 A1 * | 8/2010 | Rapaport et al. | 715/753 |
| 2010/0229080 A1 * | 9/2010 | Roulland et al. | 715/205 |
| 2011/0126105 A1 * | 5/2011 | Isozu | 715/720 |
| 2011/0191696 A1 * | 8/2011 | Jain et al. | 715/758 |
| 2012/0005598 A1 * | 1/2012 | Burckart et al. | 715/753 |

\* cited by examiner

*Primary Examiner* — Patrick Riegler
(74) *Attorney, Agent, or Firm* — Jordan IP Law, LLC

(57) ABSTRACT

Methods and systems of co-browsing may provide for establishing a co-browsing session for a local peer device, generating a navigation window associated with the co-browsing session, and loading a set of bookmarks into the navigation window. The bookmarks may also be dynamically updated based on the browsing sequence as well as shared between participants in the co-browsing session.

20 Claims, 3 Drawing Sheets

DYNAMICALLY LOADABLE CONTACT CENTER BOOKMARKS IN CO-BROWSING ENVIRONMENTS

BACKGROUND

1. Technical Field

Embodiments of the present invention generally relate to co-browsing sessions. More particularly, embodiments relate to the use of bookmarks during co-browsing sessions.

2. Discussion

Web widgets may support peer-to-peer co-browsing sessions in which two users share viewed pages. For example, a personal computer (PC) user might participate in a co-browsing session with a contact center (e.g., help desk) participant who uses a workstation to guide the user through a process such as an ordering or troubleshooting sequence of operations. While pre-existing approaches to managing co-browsing sessions may be suitable under certain circumstances, there remains considerable room for improvement. For example, although some co-browsing sessions may involve customizable and/or repeatable navigation sequences, conventional co-browsing solutions can lack the ability to leverage such customization and repeatability knowledge for future page accesses.

BRIEF SUMMARY

Embodiments may provide for a computer program product including a computer readable storage medium and computer usable code stored on the computer readable storage medium. If executed by a processor, the computer usable code causes a computer to establish a co-browsing session for a local peer device and generate a navigation window associated with the co-browsing session. The computer usable code may also cause a computer to load a set of bookmarks into the navigation window.

Embodiments can also involve a computer implemented method in which a co-browsing session is established for a local peer device and a navigation window is generated, wherein the navigation window is associated with the co-browsing session. The method may provide for determining a predefined data schema, configuring a set of bookmarks according to the predefined data schema, and loading the set of bookmarks into the navigation window. In response to detecting one or more image references in metadata associated with the set of bookmarks, one or more thumbnails can be displayed with the set of bookmarks, wherein the thumbnails correspond to the image references. Additionally, the method can involve detecting a page request associated with the co-browsing session, and modifying the set of bookmarks based on the page request. In one example, modifying the set of bookmarks includes either deleting or adding one or more bookmarks based on a uniform resource locator corresponding to the page request.

Other embodiments may include a computer program product having a computer readable storage medium and computer usable code stored on the computer readable storage medium. If executed by a processor, the computer usable code causes a computer to establish a co-browsing session for a local peer device and generate a navigation window associated with the co-browsing session. The compute usable code can also determine a predefined data schema, configure a set of bookmarks according to the predefined data schema, and load the set of bookmarks into the navigation window. In response to detecting one or more image references in metadata associated with the set of bookmarks, the computer usable code may display one or more thumbnails corresponding to the image references with the set of bookmarks, wherein the thumbnails correspond to the image references. Additionally, the computer usable code can detect a page request associated with the co-browsing session, and modify the set of bookmarks based on the page request. In one example, modifying the set of bookmarks includes at least one of deleting and adding one or more bookmarks based on a uniform resource locator corresponding to the page request.

BRIEF DESCRIPTION OF THE SEVERAL VIEWS OF THE DRAWINGS

The various advantages of the embodiments of the present invention will become apparent to one skilled in the art by reading the following specification and appended claims, and by referencing the following drawings, in which:

DETAILED DESCRIPTION

Figure 1:
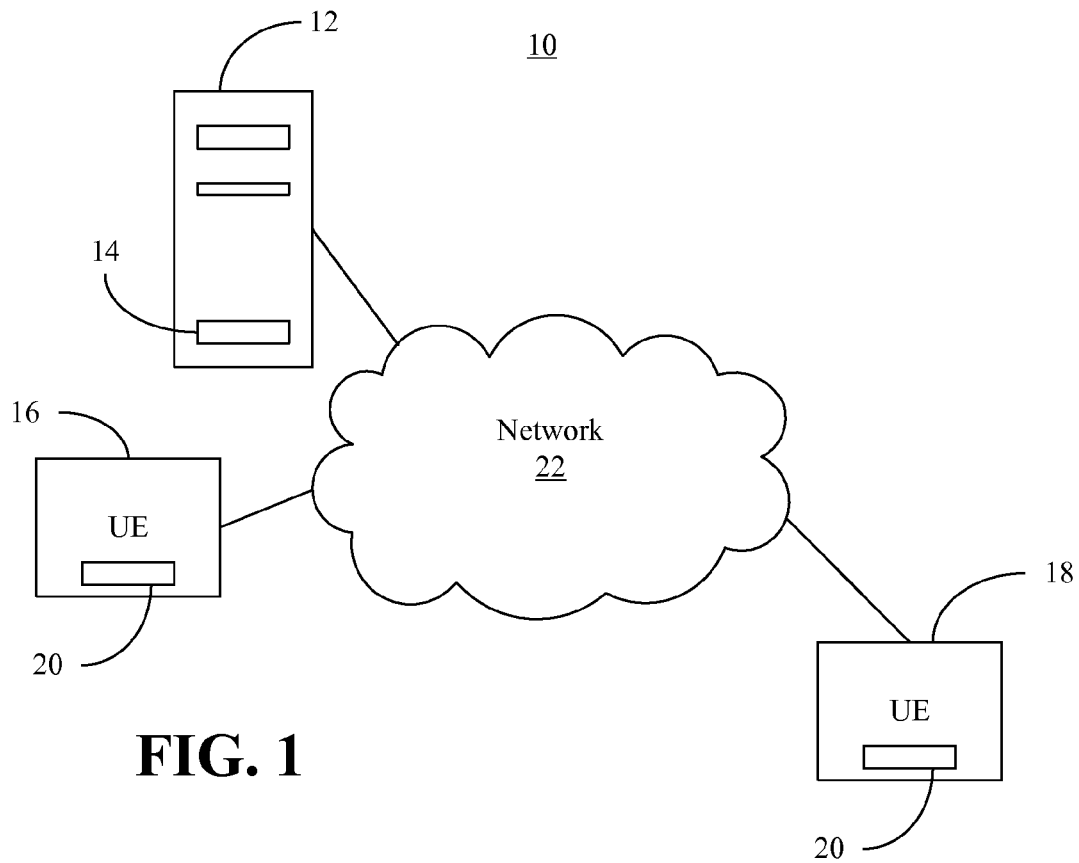
FIG. 1 is a block diagram of an example of a networking architecture according to an embodiment.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Referring now to FIG. 1, a networking architecture 10 is shown in which a server 12 includes logic 14 to establish and maintain a co-browsing session between a first user equipment (UE) device 16 and a second UE device 18, as well as to support the use of bookmarks during the co-browsing session between the UE devices 16, 18. The UE devices 16, 18 can also include logic 20 to participate in co-browsing sessions, use bookmarks during co-browsing sessions, and share bookmarks with one another. In the illustrated example, the UE devices 16, 18, which may include web browsing capability and can function as peer devices in co-browsing sessions, may include a personal computer (PC), notebook computer, personal digital assistant (PDA), wireless smartphone, or other device having access to the server 12, via a network 22. The UE device connection to the network 22 may include a wireless data connection (e.g., IEEE 802.11, 1999 Edition, LAN/MAN Wireless LANS (WiFi), IEEE 802.16-2004, LAN/MAN Broadband Wireless LANS (WiMAX), etc.), a cellular telephone connection (e.g., W-CDMA (UMTS), CDMA2000 (IS-856/IS-2000), etc.), a wired data connection (e.g., RS-232 (Electronic Industries Alliance/EIA), Ethernet (e.g., IEEE 802.3-2005, LAN/MAN CSMA/CD Access Method), power line communication (e.g., X10, IEEE P1675), USB (e.g., Universal Serial Bus 2.0 Specification)), etc., depending upon the circumstances. The UE devices 16, 18 and/or server 12 could be located in the same physical location or in different locations.

In addition, the network 22 can include any suitable combination of servers, access points, routers, base stations, mobile switching centers, public switching telephone network (PSTN) components, etc., to facilitate communication between the UE devices 16, 18 and the server 12. The server 12 may include distributed and/or redundant web-based servers that are able to respond to web page requests for content. Thus, the server 12 can have stored thereon hypertext markup language (HTML) and other markup language-encoded content, as well as databases and applications such as Java and other applications. The server 12 could also be part of a cloud computing environment in which resources are shared across platforms in a complex fashion.

Generally, the logic 20 of each UE device 16, 18 can establish a co-browsing session for the device in question, generate a navigation window associated with the co-browsing session, and load a set of bookmarks into the navigation window. As will be discussed in greater detail, the bookmarks may enable customizable, repeatable and/or known navigation sites and sequences to be captured and presented to the participants in order to enhance the effectiveness of the co-browsing session. For example, if the UE device 16 is associated with an e-commerce (electronic commerce) provider's call center and the UE device 18 is associated with a consumer contacting the call center with an ordering question, the loaded bookmarks might include a link to an order form page of the provider's web site. In such a case, the bookmark could be displayed in the co-browsing navigation window of the UE device 16, wherein the call center personnel might use the link to guide both UE devices 16, 18 to the order form page and walk the consumer through the process of filling out the order form. The bookmarks may also be sent to the UE device 18 for loading into its navigation window.

Figure 2:
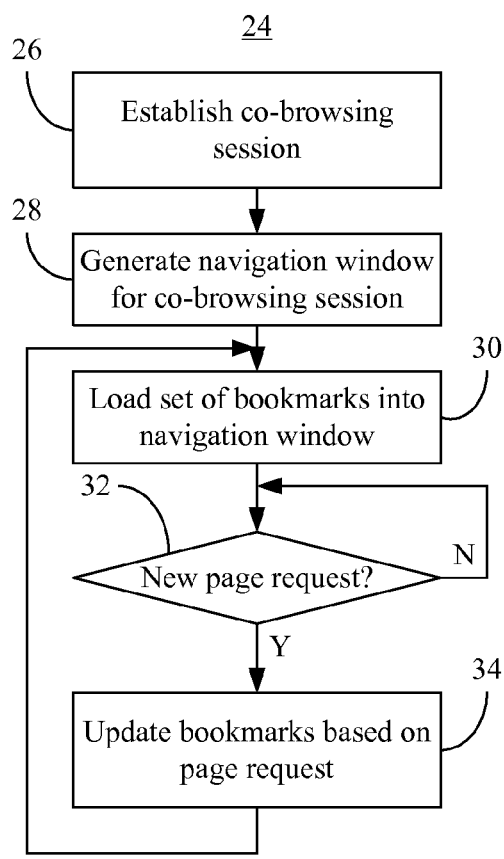
FIG. 2 is a flowchart of an example of a method of loading co-browsing session bookmarks according to an embodiment.

FIG. 2 shows a method 24 in which a set of bookmarks is used to enhance a co-browsing session between peer devices. The method 24 could be implemented in executable software as a set of widget logic instructions stored in a machine- or computer-readable medium such as random access memory (RAM), read only memory (ROM), programmable ROM (PROM), flash memory, etc., as fixed-functionality hardware using circuit technology such as application specific integrated circuit (ASIC), complementary metal oxide semiconductor (CMOS) or transistor-transistor logic (TTL) technology, or any combination thereof. Moreover, portions or all of the method 24 may be implemented in a peer device such as, for example, peer UE peer devices 16, 18 (FIG. 1) and/or a server such as, for example, server 12 (FIG. 1). Processing block 26 provides for establishing a co-browsing session for a peer device, wherein the peer device in question could be the initiator of the co-browsing session (e.g., call center computing system) or an invitee to the co-browsing session (e.g., the consumer computing system). Thus, establishing the co-browsing session could involve sending and/or responding to one or more registration, invitation, and/or initiation messages.

Once the co-browsing session is established, illustrated block 28 generates a navigation window for the co-browsing session, wherein the navigation window could be generated as a new browsing window or as a refresh of a preexisting window. A set of bookmarks may be loaded/preloaded into the navigation window for the co-browsing session at block 30. The bookmark loading process might involve determining a predefined data schema such as, for example, style element data (e.g., cascading style sheet/CSS elements, CSS rules), JSON (JavaScript Object Notification) data, extensible markup language (XML) data, image references and/or other metadata that may be used to configure the bookmarks for proper display in the navigation window. Moreover, if the metadata includes image references, thumbnails corresponding to the image references can be displayed with their respective bookmarks in the navigation window. Additionally, the loaded bookmarks may also be sent to the other participant(s) in the co-browsing session for display in one or more remote navigation windows. As will be discussed in greater detail, such an approach might involve marking one or more of the bookmarks as either shareable or private.

Illustrated block 32 determines whether a new page request has been encountered during the co-browsing session. The new page request could be for an entire page or for new content on a preexisting page, and might originate at the local peer device, at another peer device participating in the co-browsing session, or at a server such as the server 12 (FIG. 1). If a new page request is detected, block 34 may provide for updating/modifying the set of bookmarks based on the request. For example, the modification might involve adding one or more bookmarks to (and/or deleting one or more bookmarks from) the current set of bookmarks based on a URL (uniform resource locator) or other identifier corresponding to the page request, wherein the additional bookmark(s) may be provided by the server. Thus, if the operator of a call center computing system selects a link (e.g., from the bookmarks, from the page content, by typing the URL into the address bar, etc.) during a co-browsing session, the URL of the link being requested, as well as a short reference to which bookmarks are currently displayed, can be pushed to the server, which may in turn respond with an identification of the bookmarks to be added, deleted, kept, etc. The determination of which bookmarks to add and/or delete might make use of user demographics and/or web site advertising techniques such as "also buy" techniques.

Figure 3:
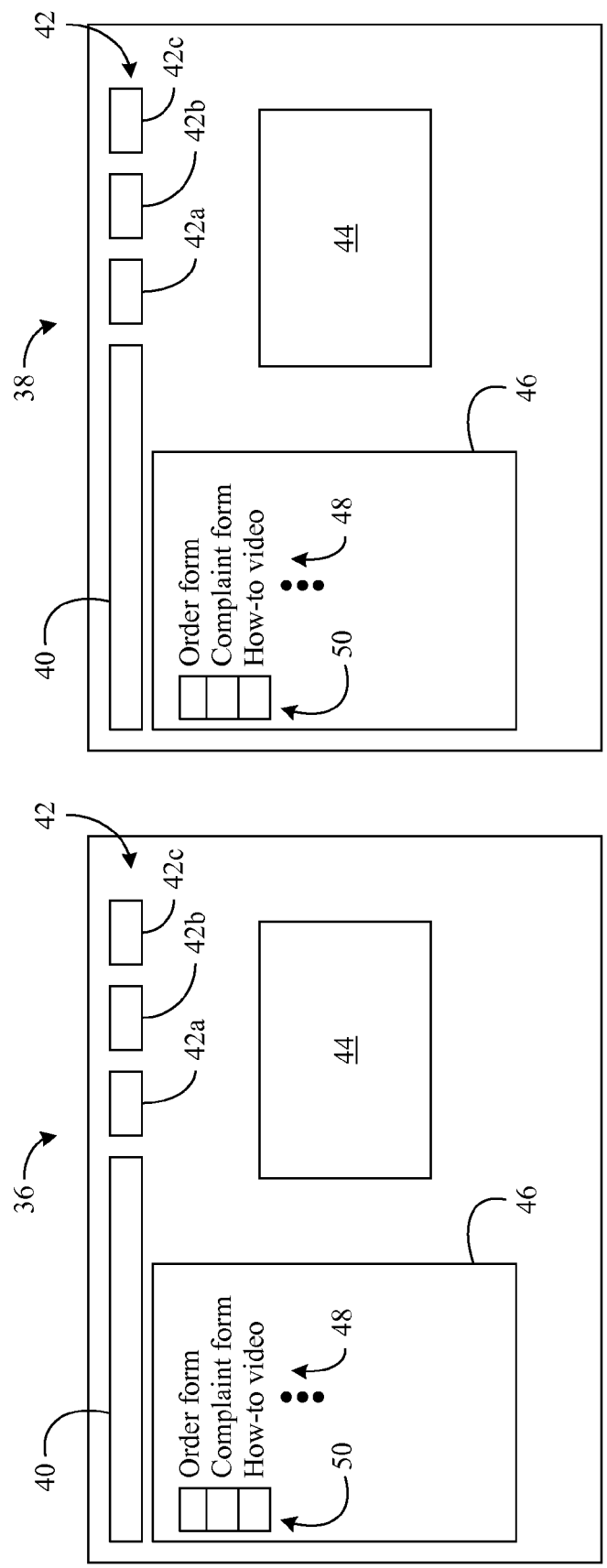
FIG. 3 is a diagram of an example of navigation windows with shareable bookmarks according to an embodiment.

Turning now to FIG. 3, navigation windows 36 and 38 are shown for a first (e.g., local) peer device and a second (e.g., remote) peer device, respectively. Each of the illustrated navigation windows 36, 38 includes an address bar 40 and one or more control buttons 42 (42a-42c) to initiate a variety of co-browsing related functions such as sending bookmarks to other peer devices (e.g., a "Send Bookmarks" button), inviting other peer devices to follow the local peer device (e.g., a "Follow Me" button) and granting remote control over the local peer device browser (e.g., a "Grant Control" button). In addition, each navigation window 36, 38 may generally include content 44 as well as a bookmark portion (e.g., side panel, drop down menu, etc.) 46 that includes a set of bookmarks 48 and one or more thumbnails 50 if the bookmarks 48 are associated with metadata that includes image references.

Thus, in the illustrated example, both navigation windows 36, 38 are permitted to view the same set of bookmarks 48. Such a solution might be implemented, for example, by responding to a "Send Bookmarks" request from the navigation window 16 of the first peer device with a prompt to mark each bookmark 48 as either "shareable" or "private". If the user replies by marking all of the bookmarks 48 as shareable, both sets of bookmarks 48 can be the same, as shown.

Figure 4:
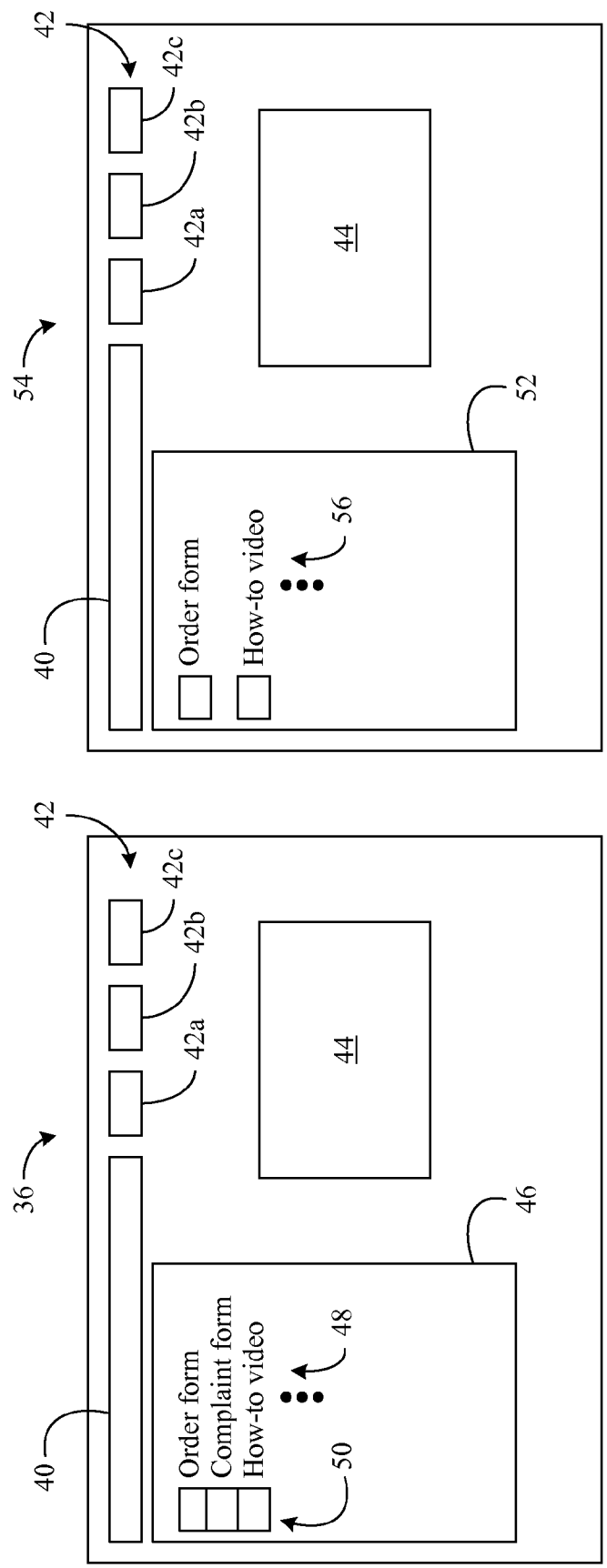
FIG. 4 is a diagram of an example of navigation windows with one or more private bookmarks according to an embodiment.

FIG. 4 shows navigation windows 36 and 54 for a first (e.g., local) peer device and a second (e.g., remote) peer device, respectively, wherein the bookmarks displayed are not the same between the devices. In particular, the user of the navigation window 36 has marked the "Complaint form" bookmark as private, in the example shown. Accordingly, the private bookmark may be deleted from the set of bookmarks 48 by logic residing at the first peer device, at the server before the bookmarks 48 are sent to the second peer device, or elsewhere in the network/system. Thus, the navigation window 54 may include a bookmark portion 52 having a different set of bookmarks 56, wherein the bookmarks 56 do not contain the bookmark that was marked as private in the navigation window 36.

Techniques described herein therefore enable context-sensitive bookmarks to be incorporated into co-browsing sessions in a unique fashion. As a result, customizable, repeatable and/or known navigation sequences may be used to speed up navigation in a wide variety of co-browsing settings such as e-commerce environments, customer support environments, technical support environments, and so on.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions. In addition, the terms "first", "second", etc. are used herein only to facilitate discussion, and carry no particular temporal or chronological significance unless otherwise indicated.

Those skilled in the art will appreciate from the foregoing description that the broad techniques of the embodiments of the present invention can be implemented in a variety of forms. Therefore, while the embodiments of this invention have been described in connection with particular examples thereof, the true scope of the embodiments of the invention should not be so limited since other modifications will become apparent to the skilled practitioner upon a study of the drawings, specification, and following claims.

We claim:

1. A computer implemented method comprising:
   establishing a co-browsing session between a local peer device and a remote peer device;
   generating a first navigation window corresponding to the local peer device and a second navigation window corresponding to the remote peer device, wherein the first navigation window and the second navigation window are associated with the co-browsing session;

automatically selecting a set of bookmarks for the first navigation window based on a context for establishing the co-browsing session between a local co-browsing session user at the local peer device and a remote co-browsing session user at the remote peer device;

determining a predefined data schema;

configuring the set of bookmarks according to the predefined data schema;

automatically adding the set of bookmarks as a set of links initially only into the first navigation window during the co-browsing session to associate the set of links with the first navigation window in response to automatically selecting the set of bookmarks based on the context for establishing the co-browsing session, wherein the information that is accessible using the set of links is created by a content provider hosting the information and remains unmodified at least until the information is accessed during the co-browsing session, and wherein each link of the set of links is selectable by the local co-browsing session user at the local peer device during the co-browsing session to independently designate each link as either sharable to be displayed at the second navigation window corresponding to the remote peer device or private to not be displayed at the second navigation window corresponding to the remote peer device;

detecting one or more image references in metadata associated with the set of bookmarks;

displaying one or more thumbnails corresponding to the one or more image references with set of bookmarks;

detecting a page request associated with the co-browsing session; and modifying the set of bookmarks based on the page request, wherein modifying the set of bookmarks includes at least one of deleting and adding one or more bookmarks based on a uniform resource locator corresponding to the page request.

2. The method of claim 1, wherein the page request originates at the local peer device.

3. The method of claim 1, further including receiving the page request from a remote peer device associated with the co-browsing session.

4. The method of claim 1, further including:

detecting a command from the local co-browsing session user at the local peer device during the co-browsing session to share the set of links associated with the first navigation window;

prompting the local co-browsing session user at the local peer device during the co-browsing session to independently mark each link of the set of links associated with the first navigation window as at least one of shareable and private; and sending the set of links that are marked by the local co-browsing session user at the local peer device as sharable during the co-browsing session to the remote peer device to be concurrently displayed at the first navigation window corresponding to the local peer device and at the second navigation window corresponding to the remote peer device.

5. A computer program product comprising:

a non-transitory computer readable storage medium; and computer usable code stored on the non-transitory computer readable storage medium, where, if executed by a processor, the computer usable code causes a computer to:

establish a co-browsing session between a local peer device and a remote peer device;

generate a first navigation window corresponding to the local peer device and a second navigation window corresponding to the remote peer device, wherein the first navigation window and the second navigation window are to be associated with the co-browsing session;

automatically select a set of bookmarks for the first navigation window based on a context for establishing the co-browsing session between a local co-browsing session user at the local peer device and a remote co-browsing session user at the remote peer device;

determine a predefined data schema;

configure the set of bookmarks according to the predefined data schema;

automatically add the set of bookmarks as a set of links initially only into the first navigation window during the co-browsing session to associate the set of links with the first navigation window in response to automatically selecting the set of bookmarks based on the context for establishing the co-browsing session, wherein information that is to be accessible using the set of links is to be created by a content provider hosting the information and is to remain unmodified at least until the information is accessed during the co-browsing session, and wherein each link of the set of links is to be selectable by the local co-browsing session user at the local peer device during the co-browsing session to independently designate each link as either sharable to be displayed at the second navigation window corresponding to the remote peer device or private to not be displayed at the second navigation window corresponding to the remote peer device;

detect one or more image references in metadata associated with the set of bookmarks;

display one or more thumbnails corresponding to the one or more image references with the set of bookmarks;

detect a page request associated with the co-browsing session; and modify the set of bookmarks based on the page request, wherein modifying the set of bookmarks is to include at least one of deleting and adding one or more bookmarks based on a uniform resource locator corresponding to the page request.

6. The computer program product of claim 5, wherein the page request is to originate at the local peer device.

7. The computer program product of claim 5, wherein the computer usable code causes a computer to receive the page request from a remote peer device associated with the co-browsing session.

8. The computer program product of claim 5, wherein the computer usable code causes a compute to:

detect a command from the local co-browsing session user at the local peer device during the co-browsing session to share the set of links associated with the first navigation window;

prompt the local co-browsing session user at the local peer device during the co-browsing session to independently mark each link of the set of links associated with the first navigation window as at least one of shareable and private; and send the set of links that are marked by the the local co-browsing session user at the local peer device as sharable during the co-browsing session to the remote peer device to be concurrently displayed at the first navigation window corresponding to the local peer device and at the second navigation window corresponding to the remote peer device.

9. A computer program product comprising:
a non-transitory computer readable storage medium; and
computer usable code stored on the non-transitory computer readable storage medium, where, if executed by a processor, the computer usable code causes a computer to:
  establish a co-browsing session between a local peer device and a remote peer device;
  generate a first navigation window corresponding to the local peer device and a second navigation window corresponding to the remote peer device, wherein the first navigation window and the second navigation window are to be associated with the co-browsing session;
  automatically select a set of bookmarks for the first navigation window based on a context for establishing the co-browsing session between a local co-browsing session user at the local peer device and a remote co-browsing session user at the remote peer device; and
  automatically add a set of bookmarks as a set of links initially only into the first navigation window during the co-browsing session to associate the set of links with the first navigation window in response to automatically selecting the set of bookmarks based on the context for establishing the co-browsing session, wherein information that is to be accessible using the set of links is to be created by a content provider hosting the information and is to remain unmodified at least until the information is accessed during the co-browsing session, and wherein each link of the set of links is to be selectable by the local co-browsing session user at the local peer device during the co-browsing session to independently designate each link as either sharable to be displayed at the second navigation window corresponding to the remote peer device or private to not be displayed at the second navigation window corresponding to the remote peer device.

10. The computer program product of claim 9, wherein the computer usable code causes a computer to:
  determine a predefined data schema; and
  configure the set of bookmarks according to the predefined data schema.

11. The computer program product of claim 9, wherein the computer usable code causes a computer to:
  detect a page request associated with the co-browsing session; and
  modify the set of bookmarks based on the page request.

12. The computer program product of claim 11, wherein the computer usable code causes a computer to delete one or more bookmarks in the set of bookmarks based on a uniform resource locator corresponding to the page request.

13. The computer program product of claim 11, wherein the computer usable code causes a computer to add one or more bookmarks to the set of bookmarks based on a uniform resource locator corresponding to the page request.

14. The computer program product of claim 11, wherein the page request is to originate at the local peer device.

15. The computer program product of claim 11, wherein the computer usable code causes a computer to receive the page request from a remote peer device associated with the co-browsing session.

16. The computer program product of claim 9, wherein the computer usable code causes a computer to:
  detect a command from the local co-browsing session user at the local peer device during the co-browsing session to share the set of links associated with the first navigation window;
  prompt the local co-browsing session user at the local peer device during the co-browsing session to independently mark each link of the set of links associated with the first navigation window as at least one of shareable and private; and
  send the set of links that are marked by the local co-browsing session user at the local peer device as sharable during the co-browsing session to the remote peer device to be concurrently displayed at the first navigation window corresponding to the local peer device and at the second navigation window corresponding to the remote peer device.

17. The computer program product of claim 9, wherein the computer usable code causes a computer to:
  detect one or more image references in metadata associated with the set of bookmarks; and
  display one or more thumbnails corresponding to the one or more image references with the set of bookmarks.

18. The method of claim 1, wherein the set of links are automatically added into one or more of a panel and a drop down menu only of the first navigation window corresponding to the local peer device during the co-browsing session.

19. The method of claim 1, wherein links of the set of links that are independently marked as sharable are sent to the remote device and displayed together with other content that is shared among the local peer device and the remote peer device, wherein the links that are sent are displayed in one or more of a panel and a drop down menu of the first navigation window corresponding to the local peer device.

20. The method of claim 1, further including determining the context for establishing the co-browsing session based on one or more of a context of an association of the local peer device with the content provider and a context of a query made from the remote co-browsing session user at the remote peer device to the local co-browser session user at the local peer device.

* * * * *